(12) United States Patent
Shaffer et al.

(10) Patent No.: US 8,415,471 B2
(45) Date of Patent: Apr. 9, 2013

(54) FLEXIBLE CYCLOALIPHATIC DIISOCYANATE TRIMERS

(75) Inventors: Myron W. Shaffer, New Cumberland, WV (US); Michael K. Jeffries, Follansbee, WV (US); David P. Zielinski, Wexford, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 68 days.

(21) Appl. No.: 11/998,383

(22) Filed: Nov. 29, 2007

(65) Prior Publication Data

US 2009/0143559 A1   Jun. 4, 2009

(51) Int. Cl.
*C07D 251/00* (2006.01)
*C08G 18/00* (2006.01)

(52) U.S. Cl. ............ 544/222; 544/67; 544/193; 528/59; 528/60; 528/61; 528/65; 528/66; 528/76; 528/80; 528/85; 560/336; 560/359

(58) Field of Classification Search ............ 528/59, 528/60, 61, 65, 66, 70, 76, 85; 544/193, 544/222, 67; 560/336, 359
See application file for complete search history.

(56) References Cited

U.S. PATENT DOCUMENTS

| | | | |
|---|---|---|---|
| 3,252,942 A | 5/1966 | France et al. | 260/77.5 |
| 3,487,080 A | 12/1969 | Matsui et al. | 260/248 |
| 4,160,080 A * | 7/1979 | Koenig et al. | 528/59 |
| 4,324,879 A | 4/1982 | Bock et al. | 528/45 |
| 4,412,073 A | 10/1983 | Robin | 544/193 |
| 4,487,928 A | 12/1984 | Richter et al. | 544/193 |
| 4,537,961 A | 8/1985 | Robin | 544/193 |
| 4,604,418 A | 8/1986 | Shindo et al. | 524/296 |
| 4,675,401 A | 6/1987 | Robin | 544/193 |
| 4,810,820 A * | 3/1989 | Slack et al. | 560/27 |
| 5,076,958 A | 12/1991 | Pedain et al. | 252/182.2 |
| 5,124,427 A | 6/1992 | Potter et al. | 528/67 |
| 5,208,334 A * | 5/1993 | Potter et al. | 544/193 |
| 5,235,018 A | 8/1993 | Potter et al. | 528/49 |
| 5,290,902 A | 3/1994 | Jacobs et al. | |
| 5,444,146 A | 8/1995 | Potter et al. | 528/49 |
| 5,576,411 A * | 11/1996 | Yeske et al. | 528/70 |
| 6,028,158 A | 2/2000 | Slack et al. | 528/44 |
| 6,063,891 A | 5/2000 | Slack et al. | 528/59 |
| 6,420,508 B1 | 7/2002 | Danielmeier et al. | |
| 7,553,963 B2 | 6/2009 | Slack et al. | |
| 2005/0101754 A1 | 5/2005 | Slack | 528/44 |
| 2006/0223970 A1 | 10/2006 | Roesler et al. | |
| 2007/0129526 A1 | 6/2007 | Slack | 528/48 |
| 2007/0218209 A1* | 9/2007 | Asahina et al. | 427/393.5 |

FOREIGN PATENT DOCUMENTS

DE   32 40 613   5/1984
WO   WO 2005082966 A1 *  9/2005

* cited by examiner

*Primary Examiner* — Michael L Leonard
(74) *Attorney, Agent, or Firm* — Robert S. Klemz; N. Denise Brown

(57) ABSTRACT

This invention relates to flexible cycloaliphatic diisocyanate trimers and a process for the preparation of these. These flexible products are allophanate-modified, partially trimerized cycloaliphatic diisocyanates and are characterized by a low $T_g$. More specifically, the $T_g$ of the resultant product ranges from about −30° C. to about 40° C., after the excess monomer has been removed from the product.

10 Claims, No Drawings

FLEXIBLE CYCLOALIPHATIC DIISOCYANATE TRIMERS

BACKGROUND OF THE INVENTION

This invention relates to an allophanate-modified, partially trimerized organic diisocyanate having cycloaliphatically bound isocyanate groups (preferably isophorone diisocyanate) which is characterized by a low $T_g$, and to a process of preparing this allophanate-modified, partially trimerized organic diisocyanate having cycloaliphatically bound isocyanate groups (preferably isophorone diisocyanate) which is characterized by a low $T_g$.

The production of isocyanurate polyisocyanates is known and described in, for example, U.S. Pat. Nos. 3,252,942, 3,487,080, 4,324,879, 4,412,073, 4,487,928, 4,537,961, 4,604,418, and 4,675,401, and DE-OS 3,240,613. Some of these prior publications disclose the use of subequivalent quantities of compounds containing hydroxyl groups. The use of polyhydric alcohols having a molecular weight below 3000 in a quantity of up to 15 mole % (based on the HDI used) in the production of isocyanurate polyisocyanates based on HDI is disclosed by U.S. Pat. No. 4,604,418. Suitable polyhydric alcohols described therein include unspecified polyester polyols. In these prior-published processes, the object of the urethane modification is merely to provide a suitable solvent for the catalyst, to achieve suitable co-catalysis or to establish compatibility with various polyols.

U.S. Pat. Nos. 5,124,427, 5,208,334, 5,235,018 and 5,444,146 disclose polyisocyanates containing allophanate and isocyanurate groups, a process for their production, and the use of these materials in two-component coating compositions. These polyisocyanate mixtures have NCO group contents of 10 to 47% by weight and contain isocyanurate and allophanate groups in a molar ratio of monoisocyanurate to monoallophanate of 10:1 to 1:5. These are prepared by catalytically trimerizing a portion of the isocyanate groups of a (cyclo) aliphatic diisocyanate, adding the monoalcohol to the diisocyanate prior to or during the trimerization reaction, and terminating the trimerization reaction at the desired degree of the reaction by adding a catalyst poison or by thermally deactivating the catalyst.

U.S. Pat. No. 5,076,958 also discloses a process for the production of isocyanurate polyisocyanates. More specifically, this process requires (a) trimerizing a portion of the isocyanate groups in the presence of a catalyst, (b) terminating the trimerization reaction, and (c) removing unreacted starting diisocyanate, and additionally, prior to step (c) adding at least one diol containing ester groups and having an average molecular weight of 350 to 950. Suitable starting diisocyanates are aliphatic or cycloaliphatic diisocyanates. This process also requires that the type of reactants used and quantitative ratios of the reactants be such that on completion of the reaction at least 10% by weight of unreacted starting diisocyanate is present in the reaction mixture (not including any inert solvent) and the molar ratio of isocyanurate groups to urethane groups in the product is 20:1 to 0.2:1. Hexamethylene diisocyanate is used in all of the working examples of U.S. Pat. No. 5,076,958.

Isocyanates that contain both allophanate groups and trimer (or isocyanurate) groups are known and described in, for example, U.S. Pat. Nos. 6,028,158 and 6,063,891, and U.S. Published Applications 20050101754 and 20070129526. These are all, however, specific to aromatic diisocyanates such as toluene diisocyanate and diphenylmethane diisocyanate.

Aliphatic diisocyanates are typically used for two-component coatings, particularly in the automotive paint industry. A blend of hexamethylene diisocyanate trimers and isophorone diisocyanate trimers is typically used in two-component automotive paint systems. Although these blends provide the desired properties, they are difficult to prepare and to use.

One of the main difficulties with blends of isocyanates such as HDI trimers and IPDI trimers is that these are difficult to catalyze due to the difference in reactivity of HDI vs. IPDI. If the HDI trimer is properly catalyzed, then the IPDI trimer typically remains unreacted. This unreacted IPDI trimer inherently reduces the chemical resistance of the system. If the IPDI trimer is properly catalyzed, then the HDI trimer reacts too fast which results in poor application. Unfortunately, there is no way to add appropriate catalysts for both HDI trimers and IPDI trimers in one system due to the differences in reactivity and $T_g$ of the two crosslinkers.

Accordingly, there is a need in this area for a crosslinker that has a glass transition temperature ($T_g$) between that of the trimer of HDI and that of the trimer of IPDI. Unfortunately, there are currently no commercially available materials that have an intermediate $T_g$.

There are several reasons why it has it has been difficult to form a crosslinker with an intermediate $T_g$. The production of a material having an intermediate $T_g$ would require that a blend of monomers be used. The use of two or more different monomers would make it difficult to control the reaction and obtain the desired blend due to differences in reactivity of the monomers. Such a process would result in a mixed monomer stream that is difficult and expensive to handle in production. In addition, the overall expense of the production process would increase due to the necessary extra tanks, segregation of stripped monomer, etc. Thus, the need for a crosslinker having an intermediate $T_g$ still exists.

Surprisingly, the novel allophanate-modified, partially trimerized cycloaliphatic diisocyanates described herein were found to have relatively low glass transition temperatures ($T_g$). In particular, these allophanate-modified, partially trimerized organic diisocyanate having cycloaliphatically bound isocyanate groups (preferably isophorone diisocyanates) have a $T_g$ ranging from about −30° C. to about 40° C. In addition, these trimer/allophanates of cycloaliphatic diisocyanates, and particularly of IPDI, exhibit long pot life and short dry times, but have comparable chemical and weathering resistance to standard blended systems (of HDI and IPDI trimers). The surprisingly favorable pot life and dry time obtained are due to the ability to catalyze without having to adjust for the different reactivities of the blend of HDI and IPDI.

SUMMARY OF THE INVENTION

This invention relates to an allophanate-modified, partially trimerized organic diisocyanate having cycloaliphatically bound isocyanate groups (preferably isophorone diisocyanate) which is characterized by a low $T_g$, and to a process for preparing the allophanate-modified, partially trimerized organic diisocyanate having cycloaliphatically bound isocyanate groups (preferably isophorone diisocyanate) which is characterized by a low $T_g$.

The allophanate-modified, partially trimerized cycloaliphatic diisocyanate (preferably 1-isocyanato-3,3,5-trimethyl-5-isocyanatomethyl cyclohexane) of the present invention is characterized by a $T_g$ which ranges from at least about −30° C. to less than or equal to about 40° C. These allophanate-modified, partially trimerized cycloaliphatic diisocyanates comprise the reaction product of:

(1) an organic diisocyanate having cycloaliphatically bound isocyanate groups, and preferably 1-isocyanato-3,3,5-trimethyl-5-isocyanatomethyl cyclohexane;
with
(2) a hydroxyl-functional organic compound having a molecular weight of 200 to 2,000 and a functionality of greater than 1 to less than or equal to 3;
in the presence of
(3) at least one suitable catalyst (preferably a trimer catalyst).

These novel allophanate-modified, partially trimerized cycloaliphatic diisocyanates (preferably 1-isocyanato-3,3,5-trimethyl-5-isocyanatomethyl cyclohexane) are preferably free of unreacted excess cycloaliphatic diisocyanate. It is preferred that the unreacted excess of diisocyanate is removed by stripping such that the resultant product has a free monomer content of less than 0.5% by weight, based on the total weight of the final product.

The process of preparing the allophanate-modified, partially trimerized cycloaliphatic diisocyanate which is characterized by a $T_g$ which ranges from at least about $-30°$ C. to less than or equal to about $40°$ C., comprises:
(A) providing an organic diisocyanate having cycloaliphatically bound isocyanate groups,
(B) trimerizing a portion of the isocyanate groups of the cycloaliphatic diisocyanate (preferably 1-isocyanato-3,3,5-trimethyl-5-isocyanatomethyl cyclohexane) in the presence of a suitable catalyst,
(C) terminating the trimerization reaction at the desired degree of conversion,
and
(D) removing unreacted excess diisocyanate (preferably 1-isocyanato-3,3,5-trimethyl-5-isocyanatomethyl cyclohexane) from the product (preferably by stripping and preferably such that the product has a free IPDI monomer content of less than 0.5% by weight, based on the total weight of the final product);
wherein prior to step (D), the process additionally comprises adding a hydroxyl-functional organic component which has a molecular weight of 200 to 2,000 and a functionality of greater than 1 to less than or equal to 3, and allowing the reaction to continue until the desired quantity of allophanate and isocyanurate groups are formed.

The present invention is also directed to a coating composition comprising the low $T_g$, allophanate-modified, partially trimerized organic diisocyanate having cycloaliphatically bound isocyanate groups, and to a process for the preparation of these coating compositions.

DETAILED DESCRIPTION OF THE INVENTION

The novel allophanate-modified, partially trimerized organic diisocyanate having cycloaliphatically bound isocyanate groups of the present invention are characterized by a low $T_g$. The allophanate-modified, partially trimerized organic diisocyanate having cycloaliphatically bound isocyanate groups typically has a $T_g$ of at least about $-30°$ C. or higher, preferably of at least about $-20°$ C. or higher, and more preferably of at least about $-10°$ C. or higher. Also, the allophanate-modified, partially trimerized organic diisocyanate having cycloaliphatically bound isocyanate groups typically has a $T_g$ of less than or equal to about $40°$ C., preferably of less than or equal to about $30°$ C., and more preferably of less than or equal to about $25°$ C. In addition, the partially trimerized organic diisocyanate having cycloaliphatically bound isocyanate groups may have a $T_g$ ranging between any combination of these upper and lower values, inclusive, e.g. from at least about $-30°$ C. to less than or equal to about $40°$ C., preferably from at least about $-20°$ C. to less than or equal to about $30°$ C., and more preferably from at least about $-10°$ C. to less than or equal to $25°$ C. The products of the invention may be used with or without monomer.

As used herein, the term molecular weight refers to the number average molecular weight and the term functionality refers to nominal functionality. The nominal functionality of a polyol, for example, refers to the average number of active hydrogen groups on the initiator or initiator blend used in producing the polyol, and the number average molecular weight is based on the measured hydroxyl number of a given polyol, and the nominal functionality of the polyol. Hydroxyl number is determined by end-group analysis and is also defined be the equation:

OH=(56.1×1000/eq. wt.)=(56.1×1000)×(f/mol. wt.)

wherein:
OH: represents the hydroxyl number of the polyol,
eq. wt.: weight per molar equivalents of contained OH groups,
f: represents the nominal functionality of the polyol, i.e. the average number of active hydrogen groups on the initiator or initiator blend used in producing the polyol,
and
mol. wt.: represents the nominal number average molecular weight based on the measured hydroxyl number and the nominal functionality of the polyol.

As used herein, the term "cycloaliphatically bound isocyanate groups" means cycloaliphatically bound isocyanate groups. This term does not include compounds having aliphatically bound isocyanate groups.

Examples of suitable diisocyanates to be used as starting materials for preparing the polyisocyanates according to the present invention are organic diisocyanates represented by the formula:

wherein R represents an organic group obtained by removing the isocyanate groups from an organic diisocyanate having cycloaliphatically bound isocyanate groups and a molecular weight of 112 to 1,000, preferably 140 to 400. Preferred diisocyanates for the process according to the invention are those represented by the above formula wherein R represents a divalent cycloaliphatic hydrocarbon group having from 5 to 15 carbon atoms. Examples of the organic diisocyanates which are particularly suitable for the process include cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)methane, 1-isocyanato-1-methyl-4(3)-isocyanatomethyl cyclohexane, and 2,4- and/or 2,6-hexahydrotoluylene diisocyanate. Mixtures of diisocyanates may also be used. Preferred diisocyanates are isophorone diisocyanate and bis-(4-isocyanatocyclohexyl)methane. Isophorone diisocyanate (IPDI) is especially preferred.

Although it is possible to use mixtures of organic diisocyanates herein, the suitable mixtures for the present invention are preferably limited to organic diisocyanates which have cycloaliphatically bound isocyanate groups. Any mixtures of the cycloaliphatically bound isocyanates herein with other diisocyanates (i.e. aliphatic and/or aromatic diisocyanates) must satisfy the requirements of $T_g$ as set forth above.

In a preferred embodiment, the organic diisocyanate component herein is free of diisocyanates which have aliphatically bound isocyanate groups and/or of diisocyanates which have aromatically bound isocyanate groups. It is most preferred that the organic isocyanate component of the present invention is free of 1,6-hexamethylene diisocyanate.

In accordance with the present invention it is preferred to treat the starting diisocyanates by bubbling an inert gas such as nitrogen through the starting diisocyanate in order to reduce the content of carbon dioxide. This process is discussed in German Offenlegungsschrift 3,806,276 (U.S. application, Ser. No. 07/311,920, the disclosure of which is hereby incorporated by reference).

Suitable compounds to be used as component (2) in accordance with the present invention include, for example, any organic compound which contains hydroxyl functionality and has a molecular weight of 200 to 2,000 and a hydroxyl functionality of greater than 1 and less than or equal to 3.

The suitable hydroxyl functional organic compounds to be used herein typically have a number average molecular weight of at least 200, preferably at least 300 and more preferably at least 400. These hydroxyl functional organic compounds also typically have a molecular weight of less than or equal to 2000, preferably less than or equal to 1500 and more preferably less than or equal to 1000. The hydroxyl functional organic compounds may have a molecular weight ranging between any combination of these upper and lower values, inclusive, e.g. from 200 to 2000, preferably from 300 to 1500 and more preferably from 400 to 1000.

These organic compounds also typically have a hydroxyl functionality of greater than 1 and less than or equal to 3. The hydroxyl functionality of these organic compounds is typically greater than 1, preferably greater than 1.5 and more preferably greater than 1.8. These organic compounds also typically have a hydroxyl functionality of less than or equal to 3, preferably less than 2.9 and more preferably less than 2.8. The organic compounds may have a hydroxyl functionality ranging between any combination of these upper and lower values, inclusive unless otherwise noted, e.g. from greater than 1 to less than or equal to 3, preferably from greater than 1.5 to less than 2.9 and more preferably from greater than 1.8 to less than 2.8.

In accordance with the present invention, suitable hydroxyl-functional organic compounds include, for example, polyether polyols, polyester polyols, polycarbonate polyols, polyacetals, polyesterethers, polyester carbonates, polythioethers, polymer polyols, polyamides, polyesteramides, polysiloxanes, polybutadienes and polyacetones. Obviously, these hydroxyl-functional organic compounds must satisfy the above requirements for molecular weight and functionality.

In a preferred embodiment of the present invention, the hydroxyl-functional organic compound additionally contains one or more ester groups. Such hydroxyl-functional organic compounds which are suitable for use herein include, for example, the known polyester diols which can be synthesized from diols and dicarboxylic acids, and caprolactone polyesters.

As is known in the art, suitable diols for the preparation of polyester diols include dimethylol cyclohexane, ethanediol, propane-1,2- and -1,3-diol, butane-1,2-, -1,3- and -1,4-diol and neopentyl glycol, and suitable dicarboxylic acids include aromatic dicarboxylic acids such as phthalic acid, isophthalic acid and terephthalic acid; cycloaliphatic dicarboxylic acids such as hexahydrophthalic acid, tetrahydrophthalic acid, endomethylene tetrahydrophthalic acid and anhydrides thereof; and preferably aliphatic dicarboxylic acids such as succinic acid, glutaric acid, adipic acid, suberic acid, azelaic acid and sebacic acid or anhydrides thereof. Mixtures of the starting materials mentioned by way of example for the production of the polyesters may also be used.

It is also possible to use mixtures of different polyesters of the type mentioned in the process according to the invention.

It is particularly preferred to use polyester diols of ε-caprolactone having a molecular weight and functionality in the range mentioned which above. Higher functionality polyesters are less preferred as the increase in functionality will start crosslinking and also increase the viscosity. Such caprolactone polyesters can be prepared in known manner from a diol of the type mentioned by way of example above as starter molecule and ε-caprolactone. In the present case, diethylene glycol and 1-4-butanediol are preferably used as this diol.

In general, the diisocyanate and the hydroxyl-functional organic compound are present in amounts such that the equivalent basis of isocyanate groups to hydroxyl groups ranges from 30:1 to about 3:1. The equivalent basis of isocyanate groups to hydroxyl groups is typically less than or equal to 30:1, preferably less than or equal to 25:1 and most preferably less than or equal to 20:1, inclusive. In addition, the equivalent basis of isocyanate groups to hydroxyl groups may be greater than or up to 3:1, and preferably greater than or equal to 5:1, inclusive. The equivalent basis of isocyanate groups to hydroxyl groups may range between any combination of these upper and lower values, inclusive, e.g. from 30:1 to 3:1, preferably from 25:1 to 5:1 and from 20:1 to 5:1.

Suitable catalysts to be used in the present invention include the catalysts known in polyurethane chemistry to be useful for forming isocyanurate groups (i.e. trimer groups). Such catalyst may commonly be referred to as trimerization catalysts. Examples of suitable catalysts include, for example, the various catalysts identified in U.S. Pat. Nos. 3,252,942, 3,487,080, 4,324,879, 4,412,073, 4,487,928, 4,537,961, 4,604,418, 4,675,401, 5,076,958, 5,124,427, 5,208,334, 5,235,018, 5,444,146, the disclosures of which are herein incorporated by reference. Quaternary ammonium hydroxides are preferably used as catalysts in the process according to the invention. Generally, it is possible to use any quaternary ammonium hydroxides known as trimerization catalysts for isocyanate groups. Suitable quaternary ammonium hydroxides include the quaternary ammonium hydroxides as described in, U.S. Pat. Nos. 3,487,080 and 4,324,879, the disclosures of which are herein incorporated by reference, and in EP-A-10,589. Other suitable quaternary ammonium hydroxides include compounds as described at column 5, lines 12-26 of U.S. Pat. No. 5,076,958, the disclosure of which is hereby incorporated by reference. Preferred catalysts include compounds which are described at column 5, lines 29-42 of U.S. Pat. No. 5,076,858, the disclosure of which is hereby incorporated by reference.

Particularly preferred catalysts are N,N,N-trimethyl-N-benzyl ammonium hydroxide and N,N,N-trimethyl-N-(2-hydroxypropyl)-ammonium hydroxide.

Obviously, a mixture of catalysts may be used in the present invention.

It is also possible to include an allophanate catalyst in the process of the present invention. Allophanate catalyst are known and described in, for example, U.S. Pat. Nos. 5,319,053, 5,319,054, the disclosures of which are hereby incorporated by reference. These include catalysts such as, for example, zinc acetylacetonate, zinc octoate, zirconium octoate, stannous octoate, etc.

The catalysts may be used in solvent-free form although they are preferably used in the form of dilute solutions. Suitable solvents are described in the cited publications.

The preparation of the allophanate-modified, partially trimerized diisocyanate (preferably IPDI) of the present invention can be done by several different methods or processes.

The processes of the invention may obviously be carried out either batchwise or continuously. The order in which the allophanatization and the trimerization take place is immaterial, provided that both process steps are carried out before removal of the excess starting diisocyanate. Thus, the allophanatization reaction between the diisocyanate and the hydroxyl-functional organic component can occur prior to the trimerization reaction. It is also within the scope of the invention for the trimerization reaction to occur first, prior to the allophanatization reaction. This requires that the hydroxyl-functional organic compound be added either after the trimerization reaction is completed or after the trimerization reaction is started but prior to the desired end point of the trimerization reaction. Obviously, the hydroxyl-functional organic compound can be added in portions at any time throughout the process. In addition, the allophanatization and the trimerization reactions can occur simultaneously in the process of the invention. Depending on the exact process used, it may be necessary to add additional diisocyanate at some point during the process. It is, however, important that both the trimerization and the allophanatization reactions be completed prior to removal of the excess starting diisocyanate. More detailed information concerning these processes is set forth below.

Another possible process of the present invention, although less preferred, is the separate formation of the allophanate component and of the trimer component, followed by blending these two separate components together to yield the desired product.

To complete (or terminate) the trimerization and allophanatization reaction, the catalyst is generally deactivated by heat and/or by the addition of a suitable catalyst poison to the reaction mixture. Suitable catalyst poisons, particularly when the preferred ammonium hydroxide catalysts are used, include inorganic acids such as hydrochloric acid, phosphorous acid or phosphoric acid; sulfonic acid or derivatives thereof such as methanesulfonic acid, p-toluene-sulfonic acid or p-toluenesulfonic acid methyl or ethyl ester; and perfluorinated sulfonic acids such as nonafluorobutane sulfonic acid. Particularly suitable deactivators, i.e. catalyst poisons, include acidic esters of phosphorous acid or phosphoric acid such as dibutylphosphite, dibutylphosphate or di-(2-ethylhexyl)-phosphate, which are preferably used in the form of a dilute solution in diisocyanate. The deactivators are generally added to the reaction mixture in a quantity at least equivalent to the catalyst. However, since the catalysts can partially decompose during the trimerization reaction, it is often sufficient to add a sub-equivalent quantity of the deactivator. When thermally labile catalysts such as quaternary ammonium hydroxides containing hydroxyalkyl substituents at the nitrogen are used, it is often unnecessary to add a catalyst poison because the reaction may be terminated by briefly heating the reaction mixture to temperatures above 100° C. (thermal decomposition, i.e., deactivation of the catalyst).

The quantitative ratios between the individual reactants should be selected to ensure that the starting diisocyanate is used in such an excess such that, on completion of the reaction, the reaction mixture still contains at least 10% by weight, preferably 35 to 70% by weight of unreacted starting diisocyanate, based on the mixture as a whole, not including any inert solvent used.

The process according to the invention is generally carried out at a temperature of about 0° C. to 150° C. The allophanatization step, which may optionally be carried out separately at the beginning or at the end of the process, preferably takes place at about 0° C. to 150° C., more preferably 50° C. to 120° C. The trimerization steps which optionally takes place separately before or after the allophanatization step, preferably takes place at a temperature of about 0° C. to 150° C., more preferably about 50° C. to 120° C. If the two reaction steps are carried out at the same time, the reaction temperatures are generally about 0° C. to 150° C., preferably about 50° C. to 120° C. The trimerization reaction is terminated thermally and/or by the addition of a catalyst poison, preferably after a degree of trimerization of about 10 to 50%, more preferably about 20 to 40% has been reached. The "degree of trimerization" is understood to be the percentage of isocyanate groups of the starting diisocyanate which reacts to form trimers; the allophanatization step is disregarded in this calculation. However, it is essential that the reaction mixture still contains at least 10% by weight of unreacted starting diisocyanate on completion of allophanatization and trimerization.

On completion of the allophanatization and trimerization reactions, the excess starting diisocyanate is separated off, optionally together with other volatile constituents present in the reaction mixture (such as solvent) by a suitable measure to a residual content of starting diisocyanate of at most 0.5% by weight. This can be done by thin-layer distillation or extraction, for example using n-hexane as extractant. It is preferred that the excess monomer is removed by stripping, and preferably results in a product that has a free (IPDI) monomer content of less than 0.5% by wt.

The end products of the process according to the invention containing allophanate and isocyanurate groups are substantially colorless polyisocyanates that are dissolved in solvent for use. The products of the process according to the invention, which are based on IPDI, generally have an NCO content of about 6 to 20% by weight and a HAZEN color value (DIN 53 409) of less than 100.

The products of the process according to the invention are soluble in standard solvents (such as esters, ketones and hydrocarbons, and may be diluted therewith without clouding) and are distinguished by high stability in storage. They are substantially free from secondary products. They are also eminently suitable for use as hardeners for two-component polyurethane lacquers, in which the usual polyether polyols, polyester polyols and/or polyacrylate polyols are present as polyhydroxyl compounds suitable as reactants for the polyisocyanates. Particularly preferred reactants for the products of the process according to the invention are polyacrylates containing hydroxyl groups, i.e., polymers or copolymers of alkyl(meth)acrylates, optionally with styrene or other copolymerizable olefinically unsaturated monomers.

One problem with IPDI trimer is that it has a very different reactivity compared to HDI trimers. This presents a unique problem for a formulator because they try to catalyze a mixture which contains polymers with different reaction rates. If the IPDI trimer is properly catalyzed the pot life suffers, or if the IPDI trimer is under catalyzed then chemical resistance will suffer. A coating formulation based solely on IPDI trimer is not possible since it suffers from very poor chemical resistance and weathering. As previously discussed, a blend of HDI and IPDI containing polyisocyanates, if catalyzed to optimize dry time, is dominated by the cure response of the HDI base polyisocyanate and typically exhibits a pot life that is too short and may cause processing problems. Conversely, if this blend is "under catalyzed", the cure response of the IPDI polyisocyanate dominates which results in poor chemical and weathering resistance.

Dry time also affects appearance. Thus, when dry time is too fast, the coating composition typically looks "tight or pinched", and reduces the gloss, DOI and other appearance properties. The reasonable dry times of the presently claimed allophanate-modified, partially trimerized cycloaliphatic diisocyanates give coatings which are smooth, have high gloss and DOI and an overall good appearance.

The present invention also relates to coating compositions that comprise the allophanate-modified, partially trimerized cycloaliphatic diisocyanates as described above, and to a process for the preparation of these coating compositions.

More specifically, the coating compositions are two-component coating compositions that comprise the reaction product of (A) the allophanate-modified, partially trimerized cycloaliphatic diisocyanates having a low $T_g$ as described herein, with (B) at least one compound that contains (preferably at least two) isocyanate-reactive groups. These coating compositions may additionally comprise (C) one or more solvents, (D) one or more additives and/or auxiliary agents including, for example, but not limited to UV absorbers, catalysts, pigments, etc. Additional details concerning these coating compositions can be found in, for example. U.S. Pat. No. 5,444,146, specifically at column 7, line 31 through column 8, line 36, the disclosure of which is hereby incorporated by reference.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all parts and percentages are parts by weight and percentages by weight, respectively.

EXAMPLES

The following materials were used in the examples described below.

IPDI: 1-isocyanato-3,3,5-trimethyl-5-isocyanatomethyl cyclohexane

Iso A: 1,3,5-tris-isocyanatohexyl)-2,4,6-trioxohexahydro-1,3,5-triazine having a functionality of about 3.5, an NCO group content of about 21.8% and a viscosity of about 2500 mPas at 25° C.

Iso B: a partially trimerized isophorone diisocyanate having about 70% solids, a functionality of about 3.3, an NCO group content of about 11.9% and a viscosity of about 2800 mPas at 25° C.

Iso C: an allophanate-modified, partially trimerized diisocyanate prepared as described in Example 5 in Table 1

Iso D: an allophanate-modified, partially trimerized diisocyanate prepared as described in Example 6 of Table 1

Diol 1: an ester-functional diol having a molecular weight of 400 which comprises the reaction product of 1,4-butanediol and ε-caprolactone, and which is commercially available from Solvay as CAPA 203

Diol 2: an ester-functional diol having a molecular weight of 520 which comprises the reaction product of diethyleneglycol and ε-caprolactone, and which is commercially available as CP-3200

Diol 3: an ester-functional diol having a molecular weight of 1220 which comprises the reaction product of 1,4-bututanediol, and which is commercially available as CP-3230.

Triol 1: an ester-functional triol having a molecular weight of 540 which comprises the reaction product of trimethylolpropane and ε-caprolactone, and which is commercially available from Solvay as CAPA 305

Polyol A: a polyacrylate resin having a hydroxyl number of 55, and which is dissolved at 55% weight solids in xylene Polyol B: a hydroxyl-functional polyacrylate resin supplied in n-butyl acetate and xylene (1:1) at 50% weight solids Polyol C: a saturated polyester polyol resin supplied in butyl acetate at 70% weight solids Catalyst A: N,N,N-trimethyl-N-(2-hydroxypropyl)-ammonium hydroxide, which is commercially available as Triton B from Aldrich or Acros Catalyst B: dibutyl tin dilaurate diluted to 1% weight solids in propylene glycol monomethyl ether acetate Stopper: dibutyl phosphate Solvent A: n-butyl acetate Solvent B: methyl isobutyl ketone Solvent C: methyl n-amyl ketone Solvent D: propylene glycol monomethyl ether acetate Solvent E: xylene Additive A: polyether-modified methyl polysiloxane which is commercially available as Baysilone OL-17, diluted to 10% in n-butyl acetate Additive B: polyether modified polydimethylsiloxane which is commercially available as BYK-331, diluted to 10% in n-butyl acetate Additive C: a solution of a polyacrylate copolymer which is commercially available as BYK-358

Additive D: cellulose acetate butyrate resin which is commercially available as CAB 551-0.01, diluted to 33% in propylene glycol monomethyl ether acetate Tinuvin 1130: a UV absorber of the hydroxyphenylbenzotriazole class diluted to 50% in xylene Tinuvin 292: a hindered amine light stabilizer diluted to 50% in xylene The following procedure was used to prepare Example 3 using relative quantities of individual components as set forth in TABLE 1.

TABLE 1

| Component | Wt. (g) | Eq. Wt. | Equivalents |
|---|---|---|---|
| IPDI | 716.21 | 111.1 | 6.45 |
| Diol 2 | 83.79 | 259.96 | 0.32 |
| Catalyst A: 5% mix in butanol | 2.30 | 3345.00 | 0.0007 |
| Stopper | 0.14 | 210.21 | 0.0007 |
| Total Wt | 800.00 | | |

Preferred Low Tg IPDI AMT Formulation:

Procedure for Preparing a low $T_g$ AMT (Allophanate-Modified Trimer) of an Diisocyanate Having Cycloaliphatically Bound Isocyanate Groups:

Into an appropriately sized round bottom reaction flask, were charged the respective amounts of IPDI and Diol 2. The contents of the flask were stirred and heated to 80° C. while bubbling nitrogen under the surface of the liquid. Once the mixture reached 80° C., this continued for 1 to 2 hours. After this time, a sample was taken to determine if the urethane step of the reaction is complete. A NCO group content of about 32.15% NCO means that the urethane reaction is completed. Once the urethane reaction is completed, the process continues with the trimerization by slowly charging to the reaction mixture a 5% solution of Catalyst A (i.e. Triton B) in n-butanol. As the allophanate and the trimer started to form, the reaction exothermed. The reaction mixture was maintained at a temperature of 80° C. to 100° C. until the % NCO reached 26.5%. When the % NCO reached 26.5%, dibutyl phosphate was charged to the mixture to stop the reaction. The excess IPDI monomer was the removed by thin film evaporation at 180° C. and <500 m Torr pressure.

The allophanate-modified, partially trimerized diisocyanates of Examples 1-2 and 4-8 in Table 2 were prepared by an analogous procedure to that described above. Additional details for each of these Examples can be found in Table 2. IPDI was used as the cycloaliphatic diisocyanate in each of Examples 1-8.

Coatings formulations were prepared in Examples 11-22. Two known isocyanates (Iso A and Iso B as previously described) were used in Examples 11, 12, 15, 16, 19 and 20. These are comparative examples. Examples 13, 14, 17, 18, 21 and 22 were prepared from allophanate-modified, partially trimerized diisocyanates which were representative of the invention. These AMT diisocyanates were those isocyanates produced in Examples 5 and 6 as set forth in Table 2.

TABLE 2

| Example | Polyol | NCO:OH | % NCO of Product | $T_g$ (° C.) | 120° C. Viscosity (cps) |
|---|---|---|---|---|---|
| 1 | Diol 1 | 20:1 | 13.12 | 21 | 5430 |
| 2 | Triol 1 | 20:1 | 14.05 | 38 | 1600 |
| 3 | Diol 2 | 20:1 | 12.48 | 22 | 6790 |
| 4 | Diol 3 | 20:1 | 9.19 | −14 | 1750 |
| 5 | Diol 1 | 20:1 | 12.97 | ND | 6890 |
| 6 | Diol 2 | 20:1 | ND | ND | ND |
| 7 | Diol 2 | 20:1 | 12.49 | 21 | ND |
| 8 | Diol 2 | 20:1 | 12.65 | 21 | 4540 |
| 9 (Iso A) | — | — | 21.8 | −60 | — |
| 10 (Iso B) | — | — | 11.9 | 60 | — |

ND not determined

TABLE 3A

Coatings Formulations of Examples 11-18

| | Example | | | | | | | |
|---|---|---|---|---|---|---|---|---|
| | 11 | 12 | 13 | 14 | 15 | 16 | 17 | 18 |
| Polyol A | 43.42 | 43.02 | 37.38 | 36.85 | | | | |
| Polyol B | | | | | 54.73 | 54.22 | 48.62 | 48.08 |
| Add. A | | | | | 0.34 | 0.34 | 0.34 | 0.34 |
| Add. B | 0.17 | 0.17 | 0.17 | 0.17 | | | | |
| Add. C | 0.32 | 0.32 | 0.32 | 0.32 | | | | |
| Add. D | | | | | 0.21 | 0.21 | 0.21 | 0.21 |
| Catalyst B | 0.34 | 0.34 | 0.34 | 0.34 | 0.34 | 0.34 | 0.34 | 0.34 |
| Tinuvin 1130 | 1.35 | 1.35 | 1.35 | 1.35 | 1.36 | 1.36 | 1.36 | 1.36 |
| Tinuvin 292 | 0.68 | 0.68 | 0.68 | 0.68 | 0.68 | 0.68 | 0.68 | 0.68 |
| Solvent A | 15.04 | 14.84 | 14.79 | 14.85 | 13.62 | 13.5 | 13.8 | 13.88 |
| Solvent B | 15.04 | 14.84 | 14.79 | 14.85 | | | | |
| Solvent C | 15.04 | 14.84 | 14.79 | 14.85 | | | | |
| Solvent D | | | | | 8.6 | 8.52 | 8.72 | 8.77 |
| Solvent E | | | | | 13.62 | 13.5 | 13.8 | 13.88 |
| Iso A | 8.61 | 7.08 | | | 6.51 | 5.41 | | |
| Iso B | | 2.53 | | | | 1.93 | | |
| Iso C | | | 15.37 | | | | 12.14 | |
| Iso D | | | | 15.75 | | | | 12.47 |

TABLE 3B

Coatings Formulations of Examples 19-22:

| | Example | | | |
|---|---|---|---|---|
| | 19 | 20 | 21 | 22 |
| Polyol C | 47.93 | 47.14 | 39.13 | 38.41 |
| Additive B | 0.26 | 0.26 | 0.26 | 0.26 |
| Additive C | 0.49 | 0.49 | 0.49 | 0.49 |
| Catalyst B | 0.51 | 0.51 | 0.51 | 0.51 |
| Tinuvin 1130 | 2.05 | 2.05 | 2.05 | 2.05 |
| Tinuvin 292 | 1.02 | 1.02 | 1.02 | 1.02 |
| Solvent A | 10.04 | 9.6 | 8.78 | 8.82 |
| Solvent B | 10.04 | 9.6 | 8.78 | 8.82 |
| Solvent C | 10.04 | 9.6 | 8.78 | 8.82 |
| Iso A | 17.63 | 14.55 | | |
| Iso B | | 5.2 | | |
| Iso C | | | 30.19 | |
| Iso D | | | | 30.79 |

TABLE 4

Coating Formulation - Results for Examples 11-22:

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Wt. Solids | 35 | 35 | 35 | 35 | 35 | 35 | 35 | 35 | 53 | 53 | 53 | 53 |
| Vol. Solids | 27.98 | 28.05 | 28.25 | 28.26 | 28.76 | 28.78 | 28.97 | 28.98 | 45.98 | 46.03 | 46.26 | 46.25 |
| PB | 0 | 0 | 0 | 0 | 0 | 0 | 0 | 0 | 0 | 0 | 0 | 0 |
| PVC | 0 | 0 | 0 | 0 | 0 | 0 | 0 | 0 | 0 | 0 | 0 | 0 |
| Wt./Gal | 7.79 | 7.79 | 7.77 | 7.77 | 8.1 | 8.09 | 8.08 | 8.08 | 8.15 | 8.16 | 8.15 | 8.15 |
| Mix Ratio | 13.57:1 | 11.60:1 | 6.45:1 | 6.27:1 | 17.36:1 | 14.84:1 | 8.08:1 | 7.84:1 | 5.74:1 | 4.85:1 | 2.62:1 | 2.55:1 |
| NCO:OH | 1.05 | 1.05 | 1.05 | 1.05 | 1.05 | 1.05 | 1.05 | 1.05 | 1.1 | 1.1 | 1.1 | 1.1 |
| VOC | 5.06 | 5.06 | 5.05 | 5.05 | 5.26 | 5.26 | 5.25 | 5.25 | 3.83 | 3.83 | 3.83 | 3.83 |

TABLE 5

Gardner Circular Dry times (in hours) for Coating Formulations of Examples 11-22:

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| STT | 0.25 | 0.25 | 0.25 | 0.25 | 0.25 | 0.25 | 0.25 | 0.25 | 0.25 | 0.25 | 0.25 | 0.25 |
| SD | 1 | 0.75 | 0.5 | 0.5 | 0.25 | 0.25 | 0.25 | 0.25 | 1.75 | 1.75 | 2 | 2.25 |
| HD | 2.5 | 1.5 | 0.75 | 1 | 0.5 | 0.5 | 0.5 | 0.75 | 2.5 | 2.25 | 3 | 3.5 |
| MF | 6 | 6 | 6 | 6 | 6 | 6 | 6 | 6 | 6 | 6 | 6 | 6 |
| Temp (° C.) | 22 | 22 | 22 | 22 | 22 | 22 | 22 | 22 | 22 | 22 | 22 | 22 |
| RH | 50 | 50 | 50 | 50 | 50 | 50 | 50 | 50 | 50 | 50 | 50 | 50 |

STT: set to touch
SD: surface dry
HD: hard dry
MF: mar free
RH: relative humidity

TABLE 6

MEK Double Rubs - Method B for Coating Formulations (rating 1-10, with 10 being no effect) for Examples 11-22:

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| # of double rubs (1 day) | 100 | 50 | 50 | 75 | 100 | 100 | 25 | 15 | 46 | 68 | 15 | 12 |
| Rating (1 day) | 2 | | | | 2 | 2 | | | | | | |
| # of double rubs (5 day) | 100 | 100 | 100 | 100 | 100 | 100 | 75 | 100 | 100 | 100 | 100 | 100 |
| Rating (5 day) | 8 | 8 | 6 | 3 | 7 | 8 | | 4 | 9 | 9 | 3 | 3 |
| # of double rubs (7 day) | 100 | 100 | 100 | 100 | 100 | 100 | 100 | 100 | 100 | 100 | 100 | 100 |
| Rating (7 day) | 10 | 9 | 7 | 4 | 7 | 6 | 2 | 2 | 10 | 9 | 6 | 6 |
| # of double rubs (14 day) | 100 | 100 | 100 | 100 | 100 | 100 | 100 | 100 | 100 | 100 | 100 | 100 |
| Rating (14 day) | | 9 | 8 | 5 | 7 | 6 | 4 | 3 | | 9 | 6 | 8 |

TABLE 7

Pendulum Hardness (in seconds) for Coating Formulations for Examples 11-22:

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Hardness Value (5 hr) | 209 | 200 | 200 | 199 | 190 | 183 | 181 | 184 | 202 | 206 | 200 | 198 |
| Hardness Value (1 day) | 161 | 165 | 149 | 159 | 151 | 150 | 140 | 147 | 144 | 159 | 129 | 130 |
| Hardness Value (7 day) | 213 | 209 | 214 | 204 | 187 | 186 | 186 | 188 | 206 | 208 | 201 | 204 |
| Hardness Value (14 day) | 214 | 209 | 216 | 210 | 189 | 187 | 192 | 193 | 209 | 210 | 209 | 207 |

TABLE 8

Water Spot Testing for Coating Formulations (rating 1-10, with 10 being no effect) for Examples 11-22:

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Rating (30 Min.) | 5 | 3 | 5 | 5 | 4 | 4 | 5 | 4 | 3 | 3 | 4 | 5 |
| Rating (1 Hr.) | 5 | 5 | 5 | 7 | 5 | 5 | 6 | 4 | 3 | 3 | 4 | 5 |
| Rating (2 Hr.) | 5 | 6 | 6 | 7 | 5 | 5 | 7 | 7 | 3 | 3 | 5 | 5 |
| Rating (3 Hr.) | 5 | 6 | 6 | 9 | 5 | 5 | 7 | 7 | 4 | 4 | 5 | 5 |
| Rating (4 Hr.) | 5 | 6 | 7 | 9 | 6 | 5 | 7 | 7 | 4 | 4 | 5 | 6 |
| Rating (5 Hr.) | 6 | 7 | 7 | 9 | 7 | 8 | 9 | 7 | 5 | 6 | 6 | 6 |
| Rating (6 Hr.) | 5 | 7 | 8 | 9 | 7 | 8 | 9 | 7 | 5 | 7 | 6 | 7 |
| Rating (7 Hr.) | 5 | 7 | 8 | 9 | 7 | 8 | 9 | 7 | 5 | 7 | 7 | 6 |

TABLE 9

Zahn Cup Viscosity Measurement for Coating Formulations (seconds of effluent time) for Examples 11-22:

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Viscosity (1 min.) | 14 | 14 | 15 | 14 | 21 | 21 | 20 | 20 | 18 | 18 | 19 | 20 |
| Viscosity (30 Min.) | 15 | 15 | 15 | 15 | 22 | 22 | 20 | 20 | 19 | 19 | 20 | 20 |
| Viscosity (1 Hr.) | 15 | 15 | 15 | 15 | 22 | 22 | 20 | 21 | 20 | 20 | 20 | 21 |
| Viscosity (2 Hr.) | 16 | 15 | 15 | 15 | 23 | 23 | 20 | 21 | 22 | 22 | 22 | 21 |
| Viscosity (3 Hr.) | 16 | 16 | 15 | 15 | 24 | 24 | 21 | 21 | 25 | 25 | 22 | 23 |
| Viscosity (4 Hr.) | 16 | 16 | 15 | 15 | 25 | 24 | 21 | 21 | 31 | 31 | 23 | 24 |
| Viscosity (5 Hr.) | 16 | 16 | 15 | 15 | 27 | 25 | 21 | 21 | 29 | 37 | 24 | 26 |
| Viscosity (6 Hr.) | 16 | 16 | 15 | 15 | 28 | 27 | 21 | 21 | 54 | 46 | 26 | 28 |
| Viscosity (7 Hr.) | 17 | 16 | 15 | 15 | 29 | 27 | 21 | 22 | | | 26 | 28 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An allophanate-modified, partially trimerized cycloaliphatic diisocyanate which is characterized by a low $T_g$, and which comprises the reaction product of:
   (1) organic diisocyanate having cycloaliphatically bound isocyanate groups, with
   (2) an hydroxyl-functional organic compound having a molecular weight of 200 to 2,000 and a functionality of greater than 1 to less than or equal to 2.9, in the presence of
   (3) at least one suitable catalyst,
   wherein the organic diisocyanate component (1) is free of diisocyanates which have aliphatically bound isocyanate groups and/or of diisocyanates which have aromatically bound isocyanate groups, and wherein the $T_g$ of the resultant product ranges from about −30° C. to about 40° C. and is measured after the removal of an unreacted excess monomer from the resultant product.

2. The allophanate-modified, partially trimerized cycloaliphatic diisocyanate of claim 1, wherein
   (1) said organic diisocyanate is 1-isocyanato-3,3,5-trimethyl-5-isocyanatomethyl cyclohexane, and
   (2) said hydroxyl-functional organic compound is selected from the group consisting of polyester diols, and caprolactone based polyester diols.

3. The allophanate-modified, partially trimerized cycloaliphatic diisocyanate of claim 1, wherein the $T_g$ ranges from about −20° C. and to about 30° C.

4. A process for preparing an allophanate-modified, partially trimerized cycloaliphatic diisocyanate which is characterized by a $T_g$ from about −30° C. to about 40° C. measured after the removal of an unreacted excess monomer from the resultant product, such process comprising:
   (A) providing an organic diisocyanate having cycloaliphatically bound isocyanate groups,
   (B) trimerizing a portion of the isocyanate groups of an organic diisocyanate having cycloaliphatically bound isocyanate groups in the presence of a suitable catalyst,
   (C) terminating the trimerization reaction at the desired degree of trimerization, and
   (D) removing unreacted excess diisocyanate from the resultant product such that the product has the free monomer content of the diisocyanate is less than 0.5% by weight;
   wherein prior to step (D), the process additionally comprises adding at least one hydroxyl-functional organic compound having a molecular weight of 200 to 2,000 and a functionality of greater than 1 to less than or equal to 2.9, and allowing the reaction to continue until the desired quantity of allophanate groups are formed and wherein the organic diisocyanate component in step (B) is free of diisocyanates which have aliphatically bound isocyanate groups and/or of diisocyanates which have aromatically bound isocyanate groups.

5. The process of claim 4, wherein
   (1) said organic diisocyanate is 1-isocyanato-3,3,5-trimethyl-5-isocyanatomethyl cyclohexane, and
   (2) said hydroxyl-functional organic compound is selected from the group consisting of polyester diols, and caprolactone based polyester diols.

6. The process of claim 4, wherein the $T_g$ ranges from about −20° C. and to about 30° C.

7. The process of claim 4, in which the trimerization and the allophanatization reactions occur simultaneously.

8. The process of claim 4, in which the trimerization reaction occurs first, followed by the allophanatization reaction.

9. The process of claim 4, in which the allophanatization reaction occurs first, followed by the trimerization reaction.

10. A coating composition comprising:
    (A) the allophanate-modified, partially trimerized cycloaliphatic diisocyanate of claim 1, and
    (B) at least one compound that contains isocyanate-reactive groups.

* * * * *

UNITED STATES PATENT AND TRADEMARK OFFICE
CERTIFICATE OF CORRECTION

PATENT NO.        : 8,415,471 B2  
APPLICATION NO.   : 11/998383  
DATED             : April 9, 2013  
INVENTOR(S)       : Myron W. Shaffer et al.

It is certified that error appears in the above-identified patent and that said Letters Patent is hereby corrected as shown below:

On title page, item 73 Assignee,
replace "Baver MaterialScience LLC,"
with "Bayer MaterialScience LLC,"

Signed and Sealed this
Fifth Day of November, 2013

Teresa Stanek Rea
*Deputy Director of the United States Patent and Trademark Office*